(12) United States Patent
McCluskey et al.

(10) Patent No.: US 10,713,153 B1
(45) Date of Patent: *Jul. 14, 2020

(54) METHOD AND SYSTEM FOR TESTING AN EXTENDED PATTERN USING AN AUTOMATIC PATTERN TESTING ENGINE

(71) Applicant: Intuit Inc., Mountain View, CA (US)

(72) Inventors: Sean McCluskey, Redwood City, CA (US); Amit Kalamkar, Fremont, CA (US); Narender Kumar, Fremont, CA (US); Sriramu Singaram, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/016,785

(22) Filed: Jun. 25, 2018

Related U.S. Application Data

(63) Continuation-in-part of application No. 15/882,671, filed on Jan. 29, 2018.

(51) Int. Cl.
*G06F 9/44* (2018.01)
*G06F 11/36* (2006.01)

(52) U.S. Cl.
CPC ...... *G06F 11/3688* (2013.01); *G06F 11/3684* (2013.01)

(58) Field of Classification Search
CPC .......................... G06F 11/3688; G06F 11/3684
USPC ........................................................ 717/124
See application file for complete search history.

(56) References Cited

U.S. PATENT DOCUMENTS

| | | |
|---|---|---|
| 9,495,188 B1 | 11/2016 | Ettema et al. |
| 10,002,058 B1 | 6/2018 | Shanmugam et al. |
| 10,466,990 B1 | 11/2019 | McCluskey et al. |
| 2004/0015762 A1* | 1/2004 | Klotz .................. G06F 11/2294 714/742 |
| 2009/0168657 A1* | 7/2009 | Puri ...................... G06F 11/263 370/248 |
| 2012/0185821 A1 | 7/2012 | Yaseen et al. |
| 2016/0202962 A1* | 7/2016 | Arif .......................... G06F 8/60 717/174 |
| 2016/0241633 A1 | 8/2016 | Overby, Jr. et al. |
| 2017/0041347 A1 | 2/2017 | Nagaratnam et al. |
| 2017/0048314 A1* | 2/2017 | Aerdts .................. G06F 9/5083 |
| 2019/0138288 A1* | 5/2019 | Brealey ..................... G06F 8/65 |

OTHER PUBLICATIONS

Title: Modeling and security in cloud ecosystems, author: E Fernandez et al, published on 2016.*

(Continued)

*Primary Examiner* — Chameli Das
(74) *Attorney, Agent, or Firm* — Paradice and Li LLP

(57) ABSTRACT

A method and system generates extended patterns from base patterns with an automatic pattern generation engine. The method and system tests the extended patterns with an automatic pattern testing engine. The patterns correspond to configurations for implementing cloud-based applications. The patterns are extendable to make additional extended patterns. Extended patterns carry the characteristics of the patterns from which they were extended. Updating a base pattern with new security measures causes a cascade effect that updates all extended patterns that descend from the base pattern.

33 Claims, 4 Drawing Sheets

(56) References Cited

OTHER PUBLICATIONS

Title: Security in cloud computing: Opportunities and challenges, author: M Ali et al, published on 2015.*
Title: Case survey methodology: Quantitative analysis of patterns across case studies author: R Larsson published on 1993.*
Title: Discovering significant patterns author: GI Webb published on 2007.*

* cited by examiner

METHOD AND SYSTEM FOR TESTING AN EXTENDED PATTERN USING AN AUTOMATIC PATTERN TESTING ENGINE

CROSS-REFERENCE TO RELATED APPLICATION

The present application is continuation-in-part of U.S. patent application Ser. No. 15/882,671, filed on Jan. 29, 2018, titled "METHOD AND SYSTEM FOR AUTOMATIC PATTERNS GENERATION AND TESTING." U.S. patent application Ser. No. 15/882,671 is incorporated herein by reference.

BACKGROUND

Cloud computing service platforms have greatly enhanced the ability of software developers and organizations that develop software to acquire and manage computing resources. Cloud computing service platforms enable software developers to quickly and easily requisition processing, storage, and server resources in order to develop and deploy software-based services. For example, software development organizations can request specific configurations of processing, storage, and server resources from a cloud computing service platform and gain access nearly immediately to cloud-based virtual resources in accordance with the requested configurations.

Prior to the availability of cloud computing service platforms, when software development organizations and service providers needed computing resources for development and deployment of software services or applications, organizations would typically budget, plan, order, and physically install computing resources in physical locations owned or controlled by the software development organizations. The process of obtaining and deploying these resources could typically take several weeks or months to complete. Cloud computing service platforms have overcome many of these drawbacks by providing relatively inexpensive and substantially immediate access to whatever computing resources may be needed by software service providers. Accordingly, cloud service platform providers increase the capabilities and flexibility of software developers to develop and deploy software services.

However, in spite of the many advantages provided by cloud computing service platforms, cloud computing service platforms suffer from several drawbacks. For example, organizations that utilize cloud computing service platforms for development and deployment of complex software services often rely on multiple groups to each develop portions of software services or applications that will need to function together. As software developers attempt to combine their individual portions into a single functioning service, or into multiple cooperating services, many difficulties arise. Oftentimes, the various portions are initially incompatible with each other because they were not built using a single framework, configuration, or infrastructure. Large amounts of human and computing resources are utilized to make these various portions of developed software compatible with each other.

Additionally, security problems arise when combining individual portions of developed software into a single functioning service. Individuals or teams that develop particular portions of services or applications each test their own particular portions separately to ensure that the portions meet security standards. Yet when the applications are combined, there are often security problems associated with the fact that the various software services or portions of software services were not developed using a single configuration or infrastructure. Again, large amounts of human and computing resources are utilized to ensure that the combination of the various portions or services together meet security standards.

Furthermore, once complex services or combinations of services are developed, it is often extremely difficult to develop services or applications that are extensions to these initially developed services or applications. The same problems of troubleshooting compatibility and security arise in the extension of services or applications, thereby requiring large amounts of human and computing resources to ensure compatibility of various portions of services or combinations of services as well as the security of these portions of services or combinations of services.

What is needed is a method and system that provide a technical solution to the technical problem of providing a framework that facilitates the efficient development, combination, extension, and testing of software development and deployment tools.

SUMMARY

Embodiments of the present disclosure provide one or more technical solutions to the technical problem of providing a framework that facilitates the efficient development, combination, extension, and testing of software development and deployment tools. Embodiments of the present disclosure store a base pattern that defines a configuration of a base machine image that can be used as a building block to implement cloud-based software applications and services. Embodiments of the present disclosure provide an automatic pattern generation engine that automatically generates extensions of the base pattern, and an automatic pattern testing engine that automatically tests the extensions of the base pattern. Extended patterns that comply with the parameters of the base pattern and pass all tests are approved and published for utilization by developers.

According to embodiments of the present disclosure, a developer that wishes to build an extended pattern that is an extension of a base pattern can provide attributes data that defines the attributes of the extended pattern. The automatic pattern generation engine automatically generates the extended pattern. The automatic pattern testing engine automatically generates test cases and tests the extended pattern based on the attributes data. If the extended pattern passes all test cases, the extended pattern is approved and published to a pattern library or database for implementation.

Accordingly, embodiments of the present disclosure generate extended patterns that are extensions of the base pattern. The basic security and application standards of the base pattern are enforced by the automatic pattern generation engine and the automatic pattern testing engine, in the extended patterns. The extended pattern is compatible in every way with the base pattern because the automatic pattern generation engine and automatic pattern testing engine only generate and publish the extended pattern if the attributes data fits within the framework defined by the base pattern and if the extended pattern passes all test cases.

The base pattern is designed to be extendable to provide building blocks that are variations of the base pattern that operate within parameters fixed by the base pattern. Updating the security standards of the base pattern causes the security standards of all the extended patterns that descend from the base pattern to be updated as well. Software developers can develop software applications for the various patterns to provide machine images for providing cloud-based software services. The base patterns and extended patterns provide an infrastructure by which developers can quickly and efficiently launch new applications. Groups of developers can each develop portions of an application using the infrastructure provided by the base pattern and its extensions, thereby ensuring compatibility and that security standards are met. In this way, embodiments of the present disclosure provide a technical solution to the technical problem of incompatible and disjointed development infrastructures.

Embodiments of the present disclosure address some of the shortcomings associated with traditional cloud-based software application development and deployment schemes. Base patterns and extended patterns in accordance with principles of the present disclosure enable software developers to quickly and efficiently develop and deploy cloud-based software applications and services. The various embodiments of the disclosure can be implemented to improve the technical fields of cloud computing, data processing, data transmission, and complex software architecture development. Therefore, the various described embodiments of the disclosure and their associated benefits amount to significantly more than an abstract idea. In particular, by providing extendable automatic base patterns, software development and deployment is significantly improved.

Figure 1:
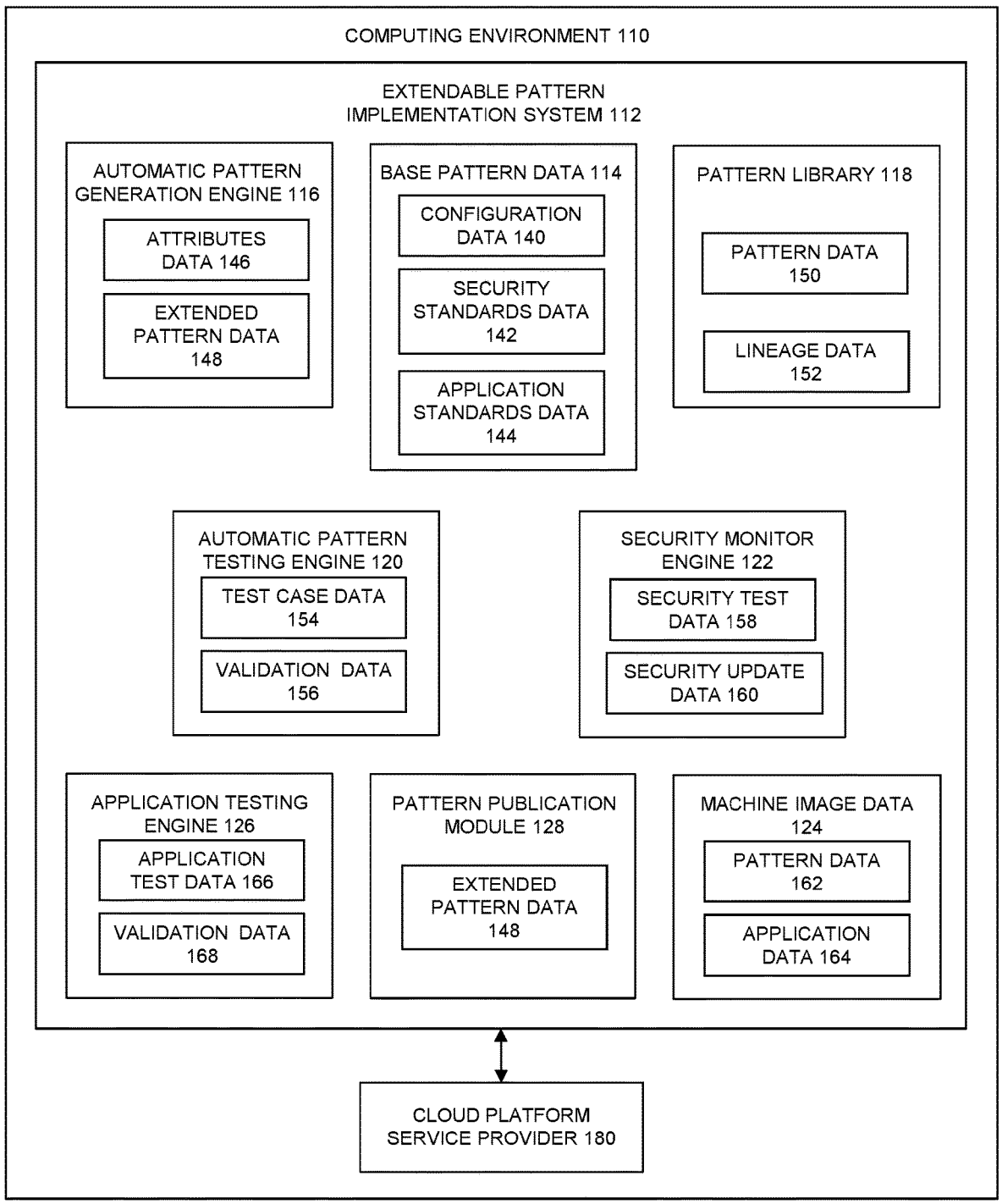
FIG. 1 is a block diagram of a system for generating extended patterns from base patterns and testing the extended patterns and testing the extended patterns, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments.

Embodiments may be implemented in many different forms and should not be construed as limited to the embodiments set forth herein, shown in the FIG. s, and/or described below. Rather, these exemplary embodiments are provided to allow a complete disclosure that conveys the principles of the invention, as set forth in the claims, to those of skill in the art.

FIG. 1 illustrates a block diagram of a production environment 100 for generating extended patterns from base patterns and testing the extended patterns, according to one embodiment. Embodiments of the present disclosure provide methods and systems for generating extended patterns from base patterns and testing the extended patterns. Embodiments of the present disclosure provide an automatic pattern generation engine and an automatic pattern testing engine that enables developers to deploy and test new machine image configurations based on previously established base patterns. A developer can select a base pattern from a library of patterns. The developer can provide attributes data to the automatic pattern generation engine for generating an extended pattern that is an extension or variation of the base pattern. If the attributes data does not violate the parameters of the base pattern, the automatic pattern generation engine generates the extended pattern having the characteristics defined by the attributes data and framework of the base pattern. The automatic pattern testing engine then automatically generates test cases and tests the extended pattern. If all test cases are passed, the extended pattern is published, output, or otherwise made available for use.

Embodiments of the present disclosure provide a development environment that enables the development of complex cloud-based systems with many individual components or applications that are guaranteed to be compatible with each other. This is because the applications and components are implemented with machine image patterns that are generated and tested in a manner that is both rapid and ensures compatibility between all applications that are descended from the same base pattern or patterns. The automatic pattern generation engine and the automatic pattern testing engine enable the rapid and successful development of extended patterns from base patterns.

Embodiments of the present disclosure provide base patterns and extended patterns that are tested against configuration, validated, and checked against threat models and failure mode and effects analysis (FMEA). Once a pattern has been verified, the pattern can be used to launch a virtual machine using a machine image based on the pattern. Additionally, the patterns can be extended or combined with other patterns to form extended patterns within the framework of the base patterns. The extended patterns are tested and validated in the same manner as the base pattern. Once the extended patterns have been validated, the extended patterns can be used to launch virtual machines using machine images based on the extended patterns. Security standards and other standards of all extended patterns can be updated by merely updating the standards of the base pattern from which they descend.

In one embodiment, when a base pattern is extended, the proposed extended pattern is tested to ensure that the proposed extended pattern does not violate any configuration constraints or security rules associated with the base pattern. If the proposed extended pattern violates any of the configuration constraints or security rules associated with the base pattern, then the proposed extended pattern is not validated and will not be permitted. Accordingly, creation of the extended pattern will fail in these circumstances. If the extended pattern does not violate any of the configuration or security constraints, then creation and implementation of the extended pattern is permitted.

In one embodiment, testing and validation of the extended pattern occurs not only at creation of the extended pattern, but throughout the lifetime of the base pattern and all extended patterns. Each time an instance of the extended pattern is implemented, the extended pattern is validated again to ensure that the extended pattern complies with all constraints of the configuration and security standards of the base pattern, and any other rules associated with extending the base pattern. If an instance of an extended pattern fails this validation, the instance of the extended pattern will be prohibited until the extended pattern is compliant.

The disclosed method and system for generating extended patterns from base patterns and testing the extended patterns provides for significant improvements to the technical fields of complex software development, electronic transaction data security, data processing, and data management.

The disclosed method and system for generating extended patterns from base patterns and testing the extended patterns provides for the processing and storing of smaller amounts of data related to security systems, i.e., fewer security systems are needed and less effective security measures can be discarded; thereby eliminating unnecessary data analysis and storage. Consequently, using the disclosed method and system for generating extended patterns from base patterns and testing the extended patterns results in more efficient use of human and non-human resources, fewer processor cycles being utilized, reduced memory utilization, and less communications bandwidth being utilized to relay data to and from, backend systems and client systems, and various investigative systems and parties. As a result, computing systems are transformed into faster, more efficient, and more effective computing systems by implementing the method and system for generating extended patterns from base patterns and testing the extended patterns.

In one embodiment, the base pattern includes configuration data that identifies a configuration of virtual resources. The virtual resources include processing resources, storage resources, relational databases, and server resources, according to various embodiments. The virtual resources are building blocks that make up the base pattern. The base pattern combines different building blocks to provide the capabilities utilized by the types of applications for which the base pattern is designed. In one embodiment, the base pattern itself is a building block that is configured to be extended and combined with other patterns to form extended patterns.

In one embodiment, the base pattern and extended patterns introduce a development process that provides a development framework that extends the concept of building blocks into the application stack. The patterns provide virtual machines that include specifically selected web services. In one embodiment, the web services include web services such as Apache Tomcat, Nginx, Cassandra, Aurora database, or other web services.

In one embodiment, the patterns are configured for particular cloud platform providers. Examples of cloud platform providers whose services the patterns can utilize include Amazon Web services (AWS), Google cloud services, and Microsoft Azure. In the example of AWS, a basic or extended pattern may launch an instance of Elastic Compute Cloud (EC2) using an Amazon Machine Image (AMI) or Docker container.

In one embodiment, a single pattern implements an entire micro service. In one embodiment the micro service includes multiple instances of multiple different web services. The desired security profile for the entire micro service is built into the pattern. Developers implement their software applications on the infrastructure defined by the pattern.

In one embodiment, the pattern defines an infrastructure on which developers deploy applications. The pattern defines rails or limits prebuilt into the infrastructure so that the machine images not only go into production but are also the machinery that can test and deploy the application. Thus, in one embodiment, the pattern will test itself, deploy itself, and police itself based on its policies.

In one embodiment, the base pattern is extendable so that the base pattern can provide different kinds of variation by enabling extended patterns to be built from the base pattern in accordance with attributes selected by developers. In one embodiment, the extended patterns are automatically testable in order to ensure that whatever applications are produced with the extended patterns are already tested.

In one embodiment, the base pattern follows an open source model. The open source model enables other developers to contribute to the base pattern and to expand the base pattern. The base pattern is designed to encompass a large number of possible use cases through itself, and through extended patterns that are generated from the base pattern.

In one embodiment, the base pattern and extended patterns enable developers of complex applications and systems to have a common approach for application and system management and development. The basic and extended patterns define a common approach for the application stack. The basic and extended patterns effectively harmonize the infrastructure and build the infrastructure for developing and deploying applications. In one embodiment, an engineer can quickly stand up the shell of a micro service and input software inside of it. The software is tested and put in production much faster this way than in traditional systems.

In traditional complex software application development, multiple groups each automate their own portion of the application or service. The framework provided by the basic and extended patterns enables the automation itself to be automated.

In one embodiment, the base pattern is an application development building block. A developer may want a different kind of building block than the building block defined by the base pattern. The base pattern includes attributes that make the base pattern extendable so that the developer can generate an extended pattern from the base pattern and having different attributes than the base pattern that, nevertheless, to within the extendable framework of the base pattern.

In one embodiment, the automatic pattern generation engine enables the rapid development and deployment of extended patterns. A developer selects a base pattern to be extended and provides attributes data indicating the new attributes of the extended pattern. If the new attributes are compatible with the framework defined by the base pattern, then the automatic pattern generation engine generates the extended pattern having the attributes selected by the developer. Thus, a developer need only provide attributes data and the automatic pattern generation engine will generate a fully compatible extended pattern.

In one embodiment, extended patterns are tested to ensure that the extended patterns have the desired attributes. If the extended patterns have the desired attributes and do not violate standards set by the base pattern, then the extended pattern is valid. The extended pattern is then ready to be implemented to launch one or more machine images or micro services.

In one embodiment, the base pattern defines an infrastructure built from multiple machine images. The infrastructure is preloaded with everything that is needed to launch applications. Extended patterns are generated from the base pattern by the automatic pattern generation engine according to the unique needs of each development team. All of this is pre-validated, deployed, and validated again. In this way the base patterns and extended patterns provide an entire computing infrastructure.

In one embodiment, the base pattern and extended patterns include or identify an operating system. However, in one embodiment, related patterns may use different operating systems from each other, or multiple operating systems. In one embodiment, the base pattern is designed to provide the multiple operating systems that may be used by development teams. The base pattern has gone through the designated systems development lifecycle (SDLC) and so the various included operating systems are officially sanctioned by the base pattern. In one embodiment extended patterns are generated from the base pattern identifying other operating systems and web services that can be used. Thus, the attributes data provided by a developer can include a selection of one or more operating systems for the extended pattern.

In one embodiment, all of the extended patterns keep the lineage of the patterns from which they are extended. In one embodiment, the extended pattern is an extension of an extended pattern which is in turn an extension of two base patterns. Each extended pattern maintains the lineage of the patterns from which it is extended. In this way, if one or more extended patterns need to be changed, developers can make the change in the base pattern and the change will cascade into all extended patterns. If a security update is needed in multiple patterns, the security update can be applied to the base pattern, and the security update will propagate to the extended patterns that extend from the base pattern. For additional security, developers can also forensically check the security of the basic and extended patterns.

In one embodiment, the base pattern is an image specification based on multiple sets of standards. A first set of standards includes best practices for working with particular operating systems or web services specified by the base pattern. The first of the standards can also include standards for operating with third parties. A second set of standards includes security standards that define security protocols for the base pattern and for any possible extended patterns. A third set of standards includes application specific standards the define standards related to specific kinds of applications expected to be implemented with the base pattern or with extended patterns based on the base pattern.

In one embodiment, the security standards help to ensure that the base pattern and any extensions from the base pattern are up-to-date. The security standards ensure that the base pattern is dispatched with the most current security standards as security standards are changed. For example, if the base pattern enables the use of a particular operating system and the new version of the operating system is released including additional security standards or patches, then the base pattern patches itself up to the latest security standards and insures that any of the extended patterns in its lineage are also updated to the latest security standards.

Traditional security practices typically focus on auditing the production environment. However, the extendable pattern implementation system according to one embodiment ensures that the base pattern and the extended patterns will enforce proper security on any application or service that is implemented using the base pattern or extended patterns. In this way, all applications and services that are implemented using a base pattern or any extended patterns will automatically implement the latest security standards via the lineage because the base pattern is constantly updated to acquire the latest security standards.

In one embodiment, the base pattern is a master pattern. The base pattern allows for variation within limits specified in the base pattern.

In one embodiment, patterns can be combined with other patterns to form compounds patterns.

In one embodiment, a test engine automatically writes test cases to test a base pattern when the base pattern is developed. In one embodiment, the test engine automatically rights test cases to test and extended pattern when an extended pattern is developed from the base pattern. The test cases ensure that whatever has been done either in the base pattern or in the extended pattern is valid in accordance with the standards that we want to apply.

The production environment 100 includes a computing environment 110. The computing environment 110 represents one or more computing systems such as a server, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to one embodiment.

In one embodiment, the computing environment 110 includes an extendable pattern implementation system 112. The extendable pattern implementation system 112 includes base pattern data 114, an automatic pattern generation engine 116, a pattern library 118, an automatic pattern testing engine 120, a security monitor engine 122, machine image data 124, an application testing engine 126, and a pattern publication module 128, according to various embodiments.

In one embodiment, the base pattern data 114 defines a base pattern. The base pattern is a modular pattern that can be automatically extended, automatically tested against configuration, validated, and checked against threat models and FMEA. Once the base pattern has been verified, the base pattern is used to launch an instance of a cloud-based virtual machine using a machine image or container. The base pattern is extendable and combinable with other patterns to create extended patterns and compound patterns.

In one embodiment, the base pattern data 114 includes configuration data 140. The configuration data 140 defines a configuration of virtual assets such as computing assets, storage assets, database assets, server assets, web service assets, and operating system assets. The base pattern is generated, based, in part, on the configuration data 140.

In one embodiment, the base pattern data 114 includes security standards data 142. The security standards data 142 defines a set of security standards for the base pattern and for extended patterns generated from the base pattern. The base pattern is generated based, in part, on the security standards data 142.

In one embodiment, the base pattern data 114 includes application standards data 144. The application standards data 144 includes application specific standards. The application specific standards include standards specific to applications or types of applications expected to be implemented with a machine image based on the base pattern. The base pattern data 114 is generated based, in part, on the application standards data 144.

In one embodiment, the automatic pattern generation engine 116 is used to generate extended patterns from the base pattern data 114. The extended patterns correspond to variations of the base pattern. If a developer desires a variation of the base pattern, the automatic pattern generation engine 116 generates an extended pattern including the desired variation from the base pattern. In one embodiment, the automatic pattern generation engine is an automatic pattern generation engine that automatically generates an extended pattern from a base pattern when attribute data is provided to the automatic pattern generation engine 116.

In one embodiment, the automatic pattern generation engine 116 receives attributes data 146. The attributes data 146 corresponds to desired attributes of an extended pattern to be generated from the base pattern. The attributes data 146 defines the ways in which the extended pattern will vary from the base pattern.

In one embodiment, the automatic pattern generation engine 116 generates extended pattern data 148 based on the attributes data 146 and the base pattern data 114. The extended pattern data 148 defines an extended pattern that is an extension of the base pattern defined by the base pattern data 114. The extended pattern includes attributes based on the attributes data 146. The attributes define ways in which the extended pattern varies from the base pattern.

In one embodiment, the extendable pattern implementation system 112 is implemented for developing components and applications of a cloud-based data management system. The data management system can include one or more of a tax return preparation system, a bookkeeping system, an accounting system, or a financial transaction monitoring system.

In the example of tax return preparation system, the tax return preparation system may need to employ various micro services for importing tax related documents from users in order to prepare tax returns for the users. A development team may develop various base patterns for providing web servers, application servers, and databases. From these base patterns the development team utilizes the automatic pattern generation engine to generate a microservice base pattern. The microservice base pattern is itself an extended pattern that is a combination and extension of various base patterns defining the individual components of a microservice. When the development team needs to implement a micro-service for importing W-2s from users of the tax return preparation system, the development team can quickly develop a W-2 importation microservice by identifying the microservice base pattern and providing attributes specific to the importation of W-2s. The automatic pattern generation engine 116 generates an extended pattern from the microservice base pattern in accordance with the attributes data provided by the development team. The W-2 importation microservice is compatible with all components of the data management system because it is generated by the automatic pattern generation engine 116 based on the previously generated base patterns.

In one example, an extended pattern that is a microservice pattern can define multiple web servers, application servers, and databases. The extended pattern can define a selected number of Nginx, Tomcat, or other types of servers. The extended pattern can define that the microservice should be autoscaling to implement as many or as few servers as current loads require.

In one embodiment, the extendable pattern implementation system 112 includes rules for enabling or denying creation of an extended pattern. These rules indicate that if an extended pattern violates configuration constraints or security standards of the base pattern, then the extended pattern will not be created. When a base pattern is extended, the proposed extended pattern is tested to ensure that the proposed extended pattern does not violate any configuration constraints or security rules associated with the base pattern. If the proposed extended pattern violates any of the configuration constraints or security rules associated with the base pattern, then the proposed extended pattern is not validated and will not be permitted. Accordingly, creation of the extended pattern will fail in these circumstances. If the extended pattern does not violate any of the configuration or security constraints, then creation and implementation of the extended pattern is permitted.

In one example, in accordance with one embodiment, the security standards of the base pattern indicate that a particular port is not allowed to be opened. If a user attempts to create an extended pattern that opens this port, the rules of the automatic pattern generation engine 116, or another component of the extendable pattern implementation system 112, will prevent creation of the extended pattern until the extended pattern conforms to the configuration and security standards of the base pattern.

In one example, in accordance with one embodiment, the configuration constraints of the base pattern indicate that a particular aspect of the configuration data of the base pattern is not allowed to be changed in an extended pattern. If a user attempts to create an extended pattern that changes this aspect of the configuration data of the base pattern, the rules of the extendable pattern implementation system 112 will prevent creation of the extended pattern until the extended pattern conforms to the configuration and security standards of the base pattern.

In one embodiment, the testing for compliance with the rules occurs not only at creation of the extended pattern, but throughout the lifetime of the base pattern and all extended patterns. Each time an instance of the extended pattern is implemented, and while the instance of the extended pattern is running, the extended pattern is validated again to ensure that the extended pattern complies with all constraints of the configuration and security standards of the base pattern, and any other rules associated with extending the base pattern. If an instance of an extended pattern fails this validation, the instance of the extended pattern will be prohibited until the extended pattern is compliant.

In one embodiment, the pattern library 118 is a database or library of patterns generated with the extendable pattern implementation system 112. The pattern library 118 includes pattern data 150. The pattern data 150 identifies all of the base patterns and all of the extended patterns generated with the extendable pattern implementation system 112. Developers have access to the base and extended patterns in order to generate other extended patterns or to populate a base or extended pattern with software instructions for an application in order to generate a machine image for launching a virtual machine to implement the application.

In one embodiment, the pattern library 118 includes lineage data 152. The lineage data 152 identifies the relationships of each of the patterns stored in the pattern data 150. In one embodiment, the base pattern may have a large tree of extended patterns that are extensions of the base pattern. The lineage data 152 identifies for every base pattern all of the extended patterns that extend therefrom. The lineage data 152 identifies, for each extended pattern, which other extended patterns the extended pattern is generated from. The lineage data 152 also identifies, for each extended pattern, which other extended patterns are extensions of the extended pattern. Thus, in one embodiment, the lineage data 152 defines a lineage tree for the base patterns and extended patterns stored in the pattern data 150.

In one embodiment, the pattern library 118 is utilized to implement launch and re-stack capabilities for the base and extended patterns included in the pattern data 150. In one embodiment, the extendable pattern implementation system 112 automatically updates security features and other features of the base patterns and extended patterns. When security standards need to be updated, the extendable pattern implementation system 112 updates the security standards for a base pattern included in the pattern data 150. The lineage data 152 causes the security standard to automatically be propagated into every extended pattern that descends from the base pattern that receives the security update. In this way, the extendable pattern implementation system 112 restacks the base pattern and any extended patterns that extend from the base pattern. The extendable pattern implementation system 112 automatically relaunches any active virtual machines based on machine images derived from the newly re-stacked base pattern and extended patterns, according to one embodiment.

In one embodiment, the extendable pattern implementation system 112 includes the automatic pattern testing engine 120. The automatic pattern testing engine 120 is configured to automatically test any base patterns or extended patterns that are newly generated or newly updated. In this way, all base patterns and extended patterns are automatically tested and validated each time a new pattern is generated for each time a pattern is updated.

In one embodiment, the automatic pattern testing engine 120 generates test case data 154 for each newly generated or newly updated pattern. The test case data 154 includes test cases for each pattern to be tested. The automatic pattern testing engine 120 then tests the validity of the patterns based on the test case data 154, according to one embodiment.

In one embodiment, when the automatic pattern testing engine 120 tests a base or extended pattern based on the test case data 154, the automatic pattern testing engine 120 generates validation data 156. The validation data 156 identifies whether the base or extended pattern is valid and compliant. If the validation data 156 indicates that the base or extended pattern is not valid or compliant, then the base or extended pattern is not updated or published. If the validation data 156 indicates that the base or extended pattern is valid and compliant, then the base or extended pattern is updated and sanctioned and is available for use.

In one embodiment, the automatic pattern testing engine 120 generates test case data 154 including test cases based on the attributes data 146. The automatic pattern testing engine 120 generates one or more test cases for each attribute provided for the base or extended pattern. Some test cases test whether a particular attribute will function properly when implemented. Some test cases test whether or not a particular attribute violates the parameters or framework of the base pattern. The test cases based on the attributes data 146 correspond to inspection self-test cases, in one embodiment.

In one embodiment, the automatic pattern testing engine 120 generates test case data 154 including test cases based on performance benchmarks. The test cases based on performance benchmarks are designed to test whether the application or micro service based on the pattern under test performs at an acceptable level. The performance benchmark test cases may be designed without consideration of the attributes data 146. Additionally, or alternatively, some performance benchmarks test cases may be designed based on particular attributes from the attributes data 146. Performance benchmarks can include whether or not the pattern-based application performs the intended functions, or whether the application performs the intended functions with an acceptable efficiency.

In one embodiment, the automatic pattern testing engine 120 generates test case data 154 including test cases designed to test security associated with an application associated with the pattern under test. The automatic pattern testing engine 120 may generate test case data 154 that checks to see if there are security vulnerabilities associated with the pattern under test. The security test cases can test whether software associated with the pattern under test includes security vulnerabilities. For example, if the pattern under test corresponds to or implements a cloud-based server, then test cases may be generated to test security vulnerabilities associated with the software implemented with that particular cloud-based server.

In one embodiment, the automatic pattern testing engine 120 generates test case data 154 including test cases designed to test the hygiene associated with the pattern under test. The hygiene test cases can test whether a cloud-based server is utilizing the latest version of the operating system implemented therein. The hygiene test cases can test whether a micro service is implementing up-to-date encryption key rotation protocols. Accordingly, the hygiene test cases ensure that the pattern under test utilizes best practices associated with the implementation and upkeep of the pattern and the applications associated with the pattern.

In one embodiment, the base pattern data 114 includes a base pattern corresponding to a micro service. A developer seeks to develop a micro service that is a variation of the base pattern. The developer provides attributes data 146 to the automatic pattern generation engine 116. The automatic pattern generation engine 116 generates an extended pattern from the base pattern in accordance with the attributes data 146. The attributes data 146 defines that the micro service will initially implement 10 cloud-based servers. The attributes data 146 also defines that the server group should be auto scaling, such that additional servers can be implemented as the load on the micro service increases. The automatic pattern generation engine 116 provides the extended pattern data, including the attributes data 146 to the automatic pattern testing engine 120. The automatic pattern testing engine 120 generates test case data 154 including test cases based on the attributes data 146. One test case may test whether the correct number of servers are initially implemented. Another test may test whether the micro service auto scales with changes in load. Additionally, the automatic pattern testing engine 120 generates performance test cases, security test cases, and hygiene test cases. The automatic pattern testing engine 120 tests the extended pattern in accordance with the test case data 154. The automatic pattern testing engine 120 generates validation data 156 indicating, for each test case, whether the extended pattern passed the test case. The validation data 156 indicates the reason that any particular test case fails.

In one embodiment, if the extended pattern data 148 and the attributes data 146 pass each of the test cases, the automatic pattern testing engine 120 causes the extended pattern data to be published or generated. When the automatic pattern testing engine approves an extended or base pattern based on the test case data 154 and the validation data 156, then the extended or base pattern is ready for implementation, for example, by automatically publishing the extended pattern data 148, or the base pattern data 114, to the pattern library 118 as an approved pattern.

In one example, an extended pattern corresponds to a single cloud-based server having attributes reflected by the attributes data 146. The attributes data indicates a specific port, a specific log directory structure, and a specific version of server software. The automatic pattern testing engine 120 generates test cases that test the port, the version of server software, and the log directory structure, in addition to other performance, security, and hygiene test cases. The automatic pattern testing engine 120 generates validation data 156 indicating pass or failure for each test case. If all test cases have passed, then the automatic pattern testing engine 120 causes the extended pattern to be, validated, generated, published, or implemented.

In one embodiment, the automatic pattern generation engine 116 and the automatic pattern testing engine 120 provide a very efficient and streamlined process for generating, testing, and implementing new patterns. To generate an extended pattern, a developer selects a base pattern and provides attributes data 146 identifying the particular attributes by which the extended pattern differs from the base pattern. The automatic pattern generation engine 116 automatically generates the extended pattern and automatically provides the extended pattern to the automatic pattern testing engine 120. When the automatic pattern testing engine 120 receives the extended pattern data 148 including the attributes data 146, the automatic pattern testing engine 120 automatically generates test case data 154 including test cases for the specific attributes defined by the attributes data 146, as well as test cases for performance, security, and hygiene. The automatic pattern testing engine 120 automatically publishes, or causes to be published, the extended pattern data 148 as an approved extended pattern. If the extended pattern fails any of the test cases, then the automatic pattern testing engine 120 indicates the reasons for failure so that the developer may adjust the attributes data accordingly. In this way, a developer needs only select a base pattern, or group of base patterns, and provide application data to the automatic pattern generation engine 116. The automatic pattern generation engine 116 and the automatic pattern testing engine 120 automatically generate and test the extended pattern.

In one embodiment, the security monitor engine 122 monitors the security of the base and extended patterns and any machine images and virtual machines implemented from the base and extended patterns. In one embodiment, the security monitor engine 122 continuously tests whether the security parameters and standards of the base and extended patterns and any machine images and virtual machines implemented from the base of extended patterns are up-to-date. The security monitor engine 122 to generate security test data 158 indicating whether or not security standards are met.

In one embodiment, the security monitor engine 122 checks for security updates that need to be applied to the base and extended patterns. The security monitor engine 122 generates security update data 160 indicating whether any security updates are available to apply to the base and extended patterns. The security monitor engine 122 applies any needed security updates to the base patterns, and the security updates are then propagated to the extended patterns from the base pattern.

In one embodiment, the extendable pattern implementation system 112 includes machine image data 124. The machine image data 124 corresponds to machine images generated from the base or extended patterns. In one embodiment, the machine images correspond to Amazon Machine Images. In one embodiment, the machine images correspond to Docker containers. Additionally, or alternatively, the machine images include other kinds of machine images known to those of skill in the art at the time of filing or in the future.

In one embodiment, the machine image data 124 includes pattern data 162. The pattern data 162 corresponds to the base or extended image from which a pattern is generated. As each machine image is based on a base or extended pattern, the pattern data 162 identifies which base or extended pattern the machine image is based on.

In one embodiment, the machine image data 124 includes application data 164. The application data 164 corresponds to a software application developed for implementation in accordance with one of the base or extended patterns. The machine images are used to launch virtual machines that implement the applications, according to one embodiment.

In one embodiment, the application testing engine 126 is configured to test the application data 164. The application testing engine 126 tests the application data 164 to ensure that the applications are compatible with the standards of the base and extended patterns in which they will be implemented. The applications that meet the standards can be implemented. The applications that do not meet the standards will not be implemented.

In one embodiment, the application testing engine 126 generates application test data 166 in order to test the application data 164. In one embodiment, the application testing engine 126 generates validation data 168 indicating whether or not the application data 164 corresponding to an application is compliant and valid.

In one embodiment, the extendable pattern implementation system 112 includes a pattern publication module 128. If the extended pattern passes all testing by the automatic pattern generation engine 116 and the automatic pattern testing engine 120, then the pattern publication module 128 publishes the extended pattern data 148 to the pattern library 118. The extended pattern data 148 is then stored in the pattern data 150 and is available for use in implementing cloud-based applications or for the generation of additional extended patterns. The lineage data 152 includes the lineage of the extended pattern.

In one embodiment, the extendable pattern implementation system 112 interfaces with a cloud platform service provider 180. The cloud platform service provider 180 provides the virtual resources utilized when a virtual machine is launched from the machine image data, according to one embodiment.

Embodiments of the present disclosure address some of the shortcomings associated with traditional cloud-based software application development and deployment schemes. Base patterns and extended patterns in accordance with principles of the present disclosure enable software developers to quickly and efficiently develop and deploy cloud-based software applications and services. The various embodiments of the disclosure can be implemented to improve the technical fields of cloud computing, data processing, data transmission, and complex software architecture development. Therefore, the various described embodiments of the disclosure and their associated benefits amount to significantly more than an abstract idea. In particular, by providing extendable automatic base patterns, software development and deployment is significantly improved.

Figure 2:
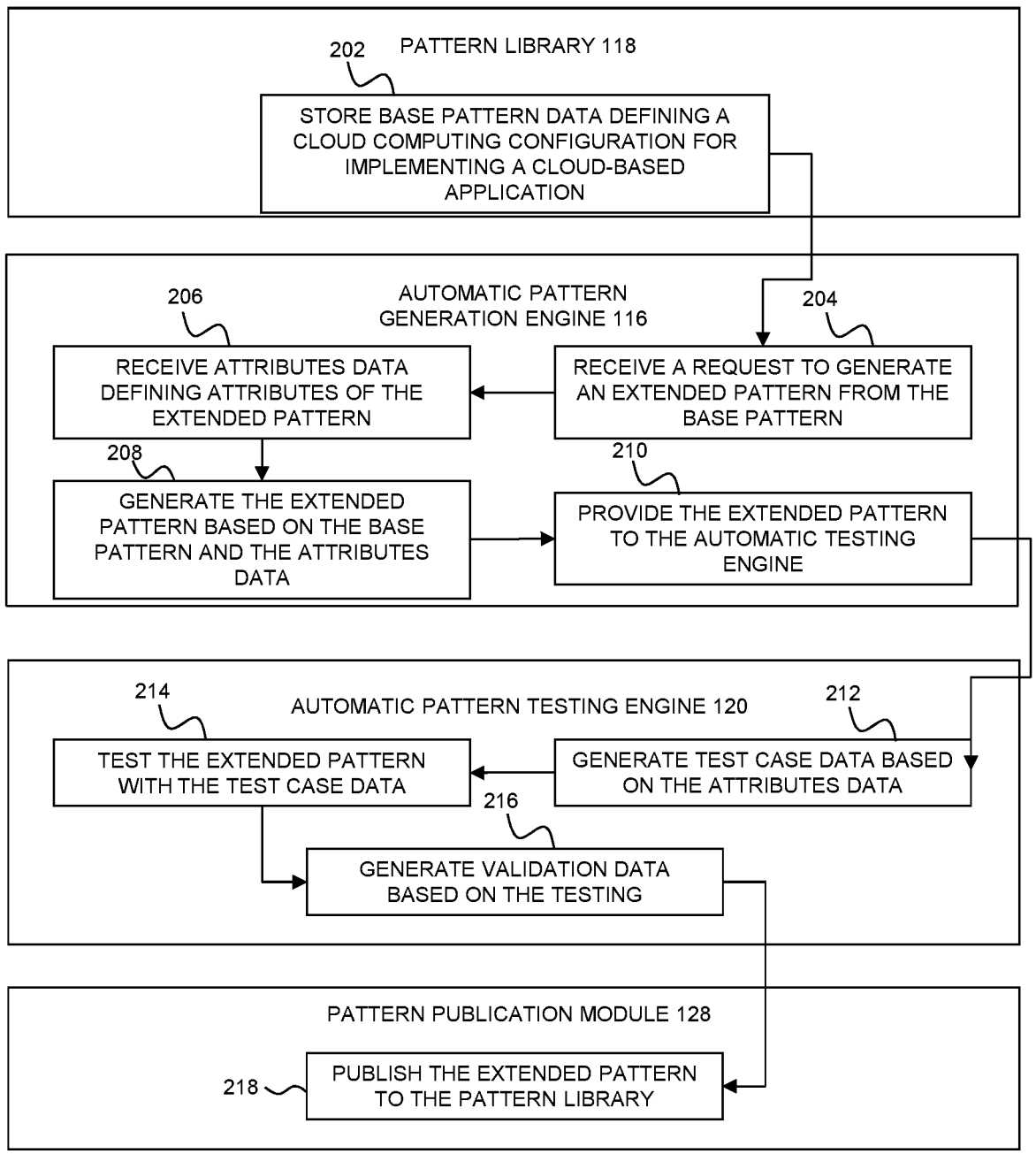
FIG. 2 is a block diagram of a process for generating extended patterns from base patterns and testing the extended patterns, in accordance with one embodiment.

FIG. 2 illustrates a functional flow diagram of a process 200 for generating extended patterns from base patterns and testing the extended patterns, in accordance with one embodiment.

Referring to FIG. 2, FIG. 1, and the description of FIG. 1 above, at block 202 the pattern library 118 stores base pattern data defining a cloud computing configuration for implementing a cloud-based application using any of the methods, processes, and procedures discussed above with respect to FIG. 1, according to one embodiment. From block 202 the process proceeds to block 204.

At block 204 the automatic pattern generation engine 116 receives a request to generate an extended pattern from the base pattern, using any of the methods, processes, and procedures discussed above with respect to FIG. 1, according to one embodiment. From block 204 the process proceeds to block 206.

At block 206 the automatic pattern generation engine 116 receives attributes data defining attributes of the extended pattern, using any of the methods, processes, and procedures discussed above with respect to FIG. 1, according to one embodiment. From block 206 the process proceeds to block 208.

At block 208, the automatic pattern generation engine 116 generates the extended pattern based on the base pattern and the attributes data, using any of the methods, processes, and procedures discussed above with respect to FIG. 1, according to one embodiment. In one embodiment, the automatic pattern generation engine 116 determines whether the application data complies with security standards data of the base pattern, and generates the extended pattern only if the attributes data complies with the security standards data of the base pattern. From block 208 the process proceeds to block 210.

At block 210, the automatic pattern generation engine 116 provides the extended pattern to the automatic pattern testing engine 120, using any of the methods, processes, and procedures discussed above with respect to FIG. 1, according to one embodiment.

At block 212, the automatic pattern testing engine 120 generates test case data based on the attributes data, using any of the methods, processes, and procedures discussed above with respect to FIG. 1, according to one embodiment. From block 212 the process proceeds to block 214.

At block 214, the automatic pattern testing engine 120 tests the extended pattern with the test case data 214, using any of the methods, processes, and procedures discussed above with respect to FIG. 1, according to one embodiment. From block 214 the process proceeds to block 216.

At block 216, the automatic pattern testing engine 120 generates validation data based on the testing, using any of the methods, processes, and procedures discussed above with respect to FIG. 1, according to one embodiment. From block 216 the process proceeds to block 218.

At block 218, the pattern publication module 128 publishes the extended pattern to the pattern library, using any of the methods, processes, and procedures discussed above with respect to FIG. 1, according to one embodiment. In one embodiment, the pattern publication module 128 publishes the extended pattern to the pattern library only if the validation data indicates that the extended pattern has passed all test cases. In one embodiment, if the validation data indicates failure of any of the test cases, the pattern publication module 128 does not publish the extended pattern to the pattern library.

Those of skill in the art will recognize, in light of the present disclosure, that the process 200 can include different steps and different orders of steps, other than those represented in FIG. 2. All such other processes fall within the scope of the present disclosure.

Figure 3:
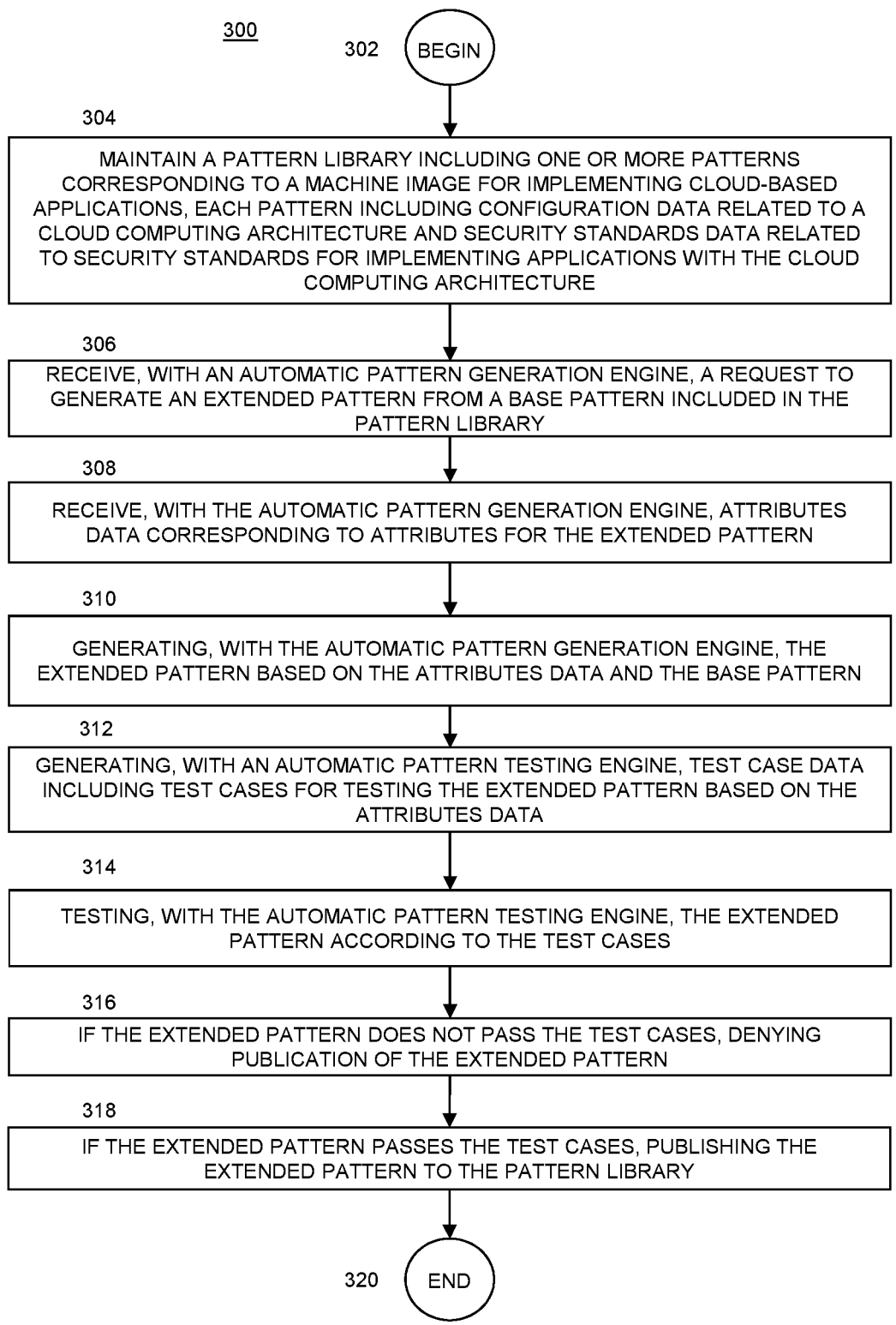
FIG. 3 is a flow diagram of a process for generating extended patterns from base patterns and testing the extended patterns, in accordance with one embodiment.

FIG. 3 illustrates a flow diagram of a process 300 for generating extended patterns from base patterns and testing the extended patterns, according to various embodiments.

Referring to FIGS. 1-3, and the description of FIGS. 1-2 above, in one embodiment, process 300 begins at BEGIN 302 and process flow proceeds to MAINTAIN A PATTERN LIBRARY INCLUDING ONE OR MORE PATTERNS CORRESPONDING TO A MACHINE IMAGE FOR IMPLEMENTING CLOUD-BASED APPLICATIONS, EACH PATTERN INCLUDING CONFIGURATION DATA RELATED TO A CLOUD COMPUTING ARCHITECTURE AND SECURITY STANDARDS DATA RELATED TO SECURITY STANDARDS FOR IMPLEMENTING APPLICATIONS WITH THE CLOUD COMPUTING ARCHITECTURE 304.

In one embodiment, at MAINTAIN A PATTERN LIBRARY INCLUDING ONE OR MORE PATTERNS CORRESPONDING TO A MACHINE IMAGE FOR IMPLEMENTING CLOUD-BASED APPLICATIONS, EACH PATTERN INCLUDING CONFIGURATION DATA RELATED TO A CLOUD COMPUTING ARCHITECTURE AND SECURITY STANDARDS DATA RELATED TO SECURITY STANDARDS FOR IMPLEMENTING APPLICATIONS WITH THE CLOUD COMPUTING ARCHITECTURE 304, a pattern library is maintained including one or more patterns corresponding to a machine image for implementing cloud-based applications, each pattern including configuration data related to a cloud computing architecture and security standards data related to security standards for implementing applications with the cloud computing architecture, using any of the methods, processes, and procedures discussed above with respect to FIGS. 1-2.

In one embodiment, once a pattern library is maintained including one or more patterns corresponding to a machine image for implementing cloud-based applications, each pattern including configuration data related to a cloud computing architecture and security standards data related to security standards for implementing applications with the cloud computing architecture at MAINTAIN A PATTERN LIBRARY INCLUDING ONE OR MORE PATTERNS CORRESPONDING TO A MACHINE IMAGE FOR IMPLEMENTING CLOUD-BASED APPLICATIONS, EACH PATTERN INCLUDING CONFIGURATION DATA RELATED TO A CLOUD COMPUTING ARCHITECTURE AND SECURITY STANDARDS DATA RELATED TO SECURITY STANDARDS FOR IMPLEMENTING APPLICATIONS WITH THE CLOUD COMPUTING ARCHITECTURE 304 process flow proceeds to RECEIVE, WITH AN AUTOMATIC PATTERN GENERATION ENGINE, A REQUEST TO GENERATE AN EXTENDED PATTERN FROM A BASE PATTERN INCLUDED IN THE PATTERN LIBRARY 306.

In one embodiment, at RECEIVE, WITH AN AUTOMATIC PATTERN GENERATION ENGINE, A REQUEST TO GENERATE AN EXTENDED PATTERN FROM A BASE PATTERN INCLUDED IN THE PATTERN LIBRARY 306, a request is received, with an automatic pattern generation engine, to generate an extended pattern from a base pattern included in the pattern library, using any of the methods, processes, and procedures discussed above with respect to FIGS. 1-2.

In one embodiment, once a request is received, with an automatic pattern generation engine, to generate an extended pattern from a base pattern included in the pattern library at RECEIVE, WITH AN AUTOMATIC PATTERN GENERATION ENGINE, A REQUEST TO GENERATE AN EXTENDED PATTERN FROM A BASE PATTERN INCLUDED IN THE PATTERN LIBRARY 306, process flow proceeds to RECEIVE, WITH THE AUTOMATIC PATTERN GENERATION ENGINE, ATTRIBUTES DATA CORRESPONDING TO ATTRIBUTES FOR THE EXTENDED PATTERN 308.

In one embodiment, at RECEIVE, WITH THE AUTOMATIC PATTERN GENERATION ENGINE, ATTRIBUTES DATA CORRESPONDING TO ATTRIBUTES FOR THE EXTENDED PATTERN 308, attributes data is received, with the automatic pattern generation engine, corresponding to attributes for the extended pattern, using any of the methods, processes, and procedures discussed above with respect to FIGS. 1-2.

In one embodiment, once attributes data is received, with the automatic pattern generation engine, corresponding to attributes for the extended pattern at RECEIVE, WITH THE AUTOMATIC PATTERN GENERATION ENGINE, ATTRIBUTES DATA CORRESPONDING TO ATTRIBUTES FOR THE EXTENDED PATTERN 308, process flow proceeds to GENERATING, WITH THE AUTOMATIC PATTERN GENERATION ENGINE, THE EXTENDED PATTERN BASED ON THE ATTRIBUTES DATA AND THE BASE PATTERN 310.

In one embodiment, at GENERATING, WITH THE AUTOMATIC PATTERN GENERATION ENGINE, THE EXTENDED PATTERN BASED ON THE ATTRIBUTES DATA AND THE BASE PATTERN 310, the extended pattern is generated, with the automatic pattern generation engine, based on the attributes data and the base pattern, using any of the methods, processes, and procedures discussed above with respect to FIGS. 1-2.

In one embodiment, once the extended pattern is generated, with the automatic pattern generation engine, based on the attributes data and the base pattern at GENERATING, WITH THE AUTOMATIC PATTERN GENERATION ENGINE, THE EXTENDED PATTERN BASED ON THE ATTRIBUTES DATA AND THE BASE PATTERN 310, process flow proceeds to GENERATING, WITH AN AUTOMATIC PATTERN TESTING ENGINE, TEST CASE DATA INCLUDING TEST CASES FOR TESTING THE EXTENDED PATTERN BASED ON THE ATTRIBUTES DATA 312.

In one embodiment, at GENERATING, WITH AN AUTOMATIC PATTERN TESTING ENGINE, TEST CASE DATA INCLUDING TEST CASES FOR TESTING THE EXTENDED PATTERN BASED ON THE ATTRIBUTES DATA 312, test case data is generated, with an automatic pattern testing engine, including test cases for testing the extended pattern based on the attributes data, using any of the methods, processes, and procedures discussed above with respect to FIGS. 1-2.

In one embodiment, once test case data is generated, with an automatic pattern testing engine, including test cases for testing the extended pattern based on the attributes data at GENERATING, WITH AN AUTOMATIC PATTERN TESTING ENGINE, TEST CASE DATA INCLUDING TEST CASES FOR TESTING THE EXTENDED PATTERN BASED ON THE ATTRIBUTES DATA 312, process flow proceeds to TESTING, WITH THE AUTOMATIC PATTERN TESTING ENGINE, THE EXTENDED PATTERN ACCORDING TO THE TEST CASES 314.

In one embodiment, at TESTING, WITH THE AUTOMATIC PATTERN TESTING ENGINE, THE EXTENDED PATTERN ACCORDING TO THE TEST CASES 314, the extended pattern is tested, with the automatic pattern testing engine, according to the test cases, using any of the methods, processes, and procedures discussed above with respect to FIGS. 1-2.

In one embodiment, once the extended pattern is tested, with the automatic pattern testing engine, according to the test cases data at TESTING, WITH THE AUTOMATIC PATTERN TESTING ENGINE, THE EXTENDED PATTERN ACCORDING TO THE TEST CASES 314, process flow proceeds to IF THE EXTENDED PATTERN DOES NOT PASS THE TEST CASES, DENYING PUBLICATION OF THE EXTENDED PATTERN 316.

In one embodiment, at IF THE EXTENDED PATTERN DOES NOT PASS THE TEST CASES, DENYING PUBLICATION OF THE EXTENDED PATTERN 316, if the extended pattern does not pass the test cases, publication of the extended pattern is denied, using any of the methods, processes, and procedures discussed above with respect to FIGS. 1-2.

In one embodiment, once, if the extended pattern does not pass the test cases, publication of the extended pattern is denied at IF THE EXTENDED PATTERN DOES NOT PASS THE TEST CASES, DENYING PUBLICATION OF THE EXTENDED PATTERN 316, process flow proceeds to IF THE EXTENDED PATTERN PASSES THE TEST CASES, PUBLISHING THE EXTENDED PATTERN TO THE PATTERN LIBRARY 318.

In one embodiment, at IF THE EXTENDED PATTERN PASSES THE TEST CASES, PUBLISHING THE EXTENDED PATTERN TO THE PATTERN LIBRARY 318, if the extended pattern passes the test cases, the extended pattern is published to the pattern library, using any of the methods, processes, and procedures discussed above with respect to FIGS. 1-2.

In one embodiment, once if the extended pattern passes the test cases, the extended pattern is published to the pattern library at IF THE EXTENDED PATTERN PASSES THE TEST CASES, PUBLISHING THE EXTENDED PATTERN TO THE PATTERN LIBRARY 318, process flow proceeds to END 320.

In one embodiment, at END 320 the process for generating extended patterns from base patterns and testing the extended patterns is exited to await new data and/or instructions.

Figure 4:
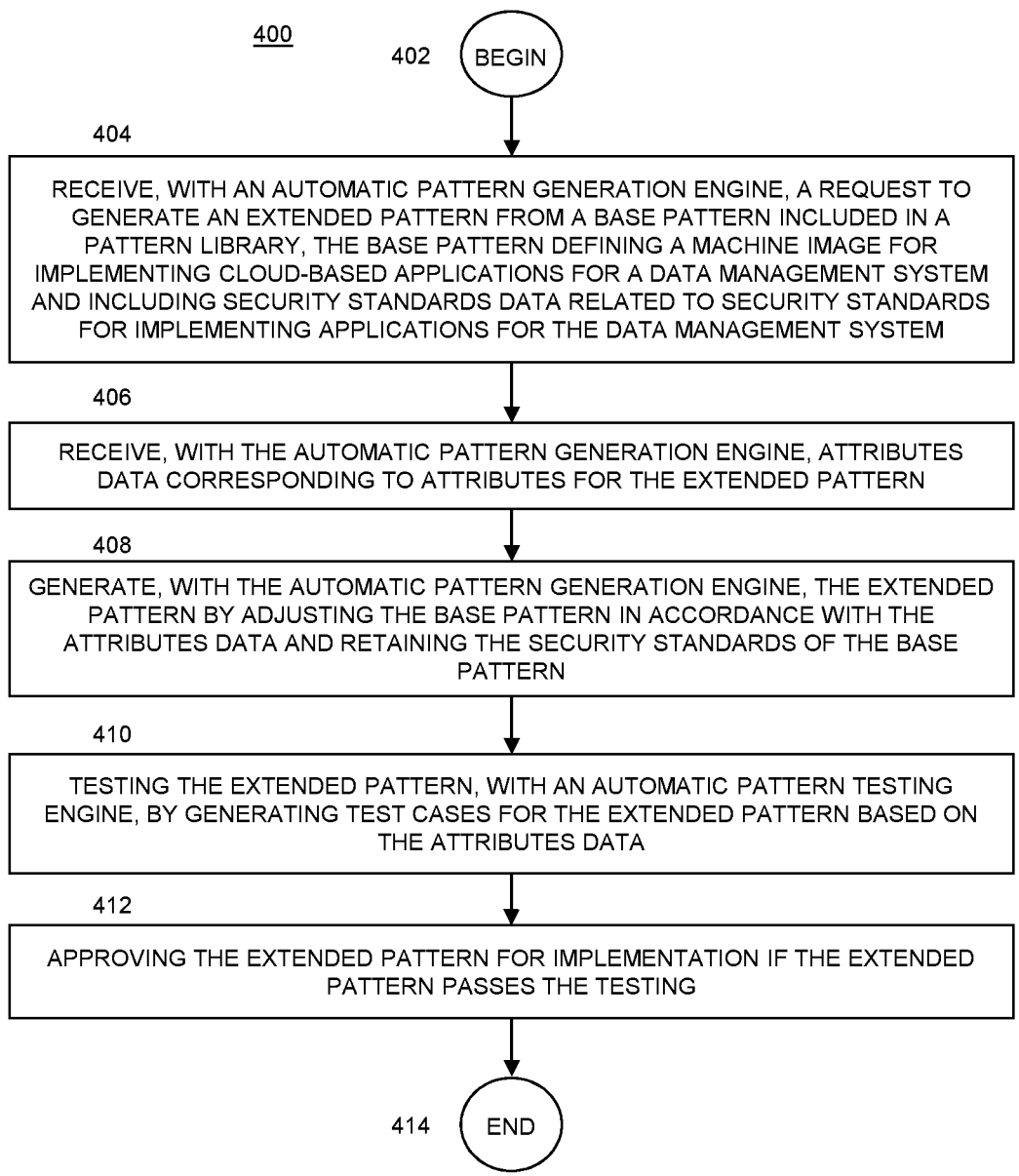
FIG. 4 is a flow diagram of a process for generating extended patterns from base patterns and testing the extended patterns, in accordance with one embodiment.

FIG. 4 illustrates a flow diagram of a process 400 for generating extended patterns from base patterns and testing the extended patterns, according to various embodiments.

Referring to FIG. 4, FIGS. 1-2, and the description of FIGS. 1-2 above, in one embodiment, process 400 begins at BEGIN 402 and process flow proceeds to RECEIVE, WITH AN AUTOMATIC PATTERN GENERATION ENGINE, A REQUEST TO GENERATE AN EXTENDED PATTERN FROM A BASE PATTERN INCLUDED IN A PATTERN LIBRARY, THE BASE PATTERN DEFINING A MACHINE IMAGE FOR IMPLEMENTING CLOUD-BASED APPLICATIONS FOR A DATA MANAGEMENT SYSTEM AND INCLUDING SECURITY STANDARDS DATA RELATED TO SECURITY STANDARDS FOR IMPLEMENTING APPLICATIONS FOR THE DATA MANAGEMENT SYSTEM 404.

In one embodiment, at RECEIVE, WITH AN AUTOMATIC PATTERN GENERATION ENGINE, A REQUEST TO GENERATE AN EXTENDED PATTERN FROM A BASE PATTERN INCLUDED IN A PATTERN LIBRARY, THE BASE PATTERN DEFINING A MACHINE IMAGE FOR IMPLEMENTING CLOUD-BASED APPLICATIONS FOR A DATA MANAGEMENT SYSTEM AND INCLUDING SECURITY STANDARDS DATA RELATED TO SECURITY STANDARDS FOR IMPLEMENTING APPLICATIONS FOR THE DATA MANAGEMENT SYSTEM 404, a request is received, with an automatic pattern generation engine, to generate an extended pattern from a base pattern included in a pattern library, the base pattern defining a machine image for implementing cloud-based applications for a data management system and including security standards data related to security standards for implementing applications for the data management system, using any of the methods, processes, and procedures discussed above with respect to FIGS. 1-2.

In one embodiment, once a request is received, with an automatic pattern generation engine, to generate an extended pattern from a base pattern included in a pattern library, the base pattern defining a machine image for implementing cloud-based applications for a data management system and including security standards data related to security standards for implementing applications for the data management system at RECEIVE, WITH AN AUTOMATIC PATTERN GENERATION ENGINE, A REQUEST TO GENERATE AN EXTENDED PATTERN FROM A BASE PATTERN INCLUDED IN A PATTERN LIBRARY, THE BASE PATTERN DEFINING A MACHINE IMAGE FOR IMPLEMENTING CLOUD-BASED APPLICATIONS FOR A DATA MANAGEMENT SYSTEM AND INCLUDING SECURITY STANDARDS DATA RELATED TO SECURITY STANDARDS FOR IMPLEMENTING APPLICATIONS FOR THE DATA MANAGEMENT SYSTEM 404 process flow proceeds to RECEIVE, WITH THE AUTOMATIC PATTERN GENERATION ENGINE, ATTRIBUTES DATA CORRESPONDING TO ATTRIBUTES FOR THE EXTENDED PATTERN 406.

In one embodiment, at RECEIVE, WITH THE AUTOMATIC PATTERN GENERATION ENGINE, ATTRIBUTES DATA CORRESPONDING TO ATTRIBUTES FOR THE EXTENDED PATTERN 406, attributes data is received, with the automatic pattern generation engine, corresponding to attributes for the extended pattern, using any of the methods, processes, and procedures discussed above with respect to FIGS. 1-2.

In one embodiment, once attributes data is received, with the automatic pattern generation engine, corresponding to attributes for the extended pattern at RECEIVE, WITH THE AUTOMATIC PATTERN GENERATION ENGINE, ATTRIBUTES DATA CORRESPONDING TO ATTRIBUTES FOR THE EXTENDED PATTERN 406, process flow proceeds to GENERATE, WITH THE AUTOMATIC PATTERN GENERATION ENGINE, THE EXTENDED PATTERN BY ADJUSTING THE BASE PATTERN IN ACCORDANCE WITH THE ATTRIBUTES DATA AND RETAINING THE SECURITY STANDARDS OF THE BASE PATTERN 408.

In one embodiment, at GENERATE, WITH THE AUTOMATIC PATTERN GENERATION ENGINE, THE EXTENDED PATTERN BY ADJUSTING THE BASE PATTERN IN ACCORDANCE WITH THE ATTRIBUTES DATA AND RETAINING THE SECURITY STANDARDS OF THE BASE PATTERN 408, the extended pattern is generated, with the automatic pattern generation engine, by adjusting the base pattern in accordance with the attributes data and retaining the security standards of the base pattern, using any of the methods, processes, and procedures discussed above with respect to FIGS. 1-2.

In one embodiment, once the extended pattern is generated, with the automatic pattern generation engine, by adjusting the base pattern in accordance with the attributes data and retaining the security standards of the base pattern at GENERATE, WITH THE AUTOMATIC PATTERN GENERATION ENGINE, THE EXTENDED PATTERN BY ADJUSTING THE BASE PATTERN IN ACCORDANCE WITH THE ATTRIBUTES DATA AND RETAINING THE SECURITY STANDARDS OF THE BASE PATTERN 408, process flow proceeds to TESTING THE EXTENDED PATTERN, WITH AN AUTOMATIC PATTERN TESTING ENGINE, BY GENERATING TEST CASES FOR THE EXTENDED PATTERN BASED ON THE ATTRIBUTES DATA 410.

In one embodiment, at TESTING THE EXTENDED PATTERN, WITH AN AUTOMATIC PATTERN TESTING ENGINE, BY GENERATING TEST CASES FOR THE EXTENDED PATTERN BASED ON THE ATTRIBUTES DATA 410, the extended pattern is tested, with an automatic pattern testing engine, by generating test cases for the extended pattern based on the attributes data, using any of the methods, processes, and procedures discussed above with respect to FIGS. 1-2.

In one embodiment, once the extended pattern is tested, with an automatic pattern testing engine, by generating test cases for the extended pattern based on the attributes data at TESTING THE EXTENDED PATTERN, WITH AN AUTOMATIC PATTERN TESTING ENGINE, BY GENERATING TEST CASES FOR THE EXTENDED PATTERN BASED ON THE ATTRIBUTES DATA 410, process flow proceeds to APPROVING THE EXTENDED PATTERN FOR IMPLEMENTATION IF THE EXTENDED PATTERN PASSES THE TESTING 412.

In one embodiment, at APPROVING THE EXTENDED PATTERN FOR IMPLEMENTATION IF THE EXTENDED PATTERN PASSES THE TESTING 412, the extended pattern is approved for implementation, if the extended pattern passes the testing, using any of the methods, processes, and procedures discussed above with respect to FIGS. 1-2.

In one embodiment, once the extended pattern is approved for implementation, if the extended pattern passes the testing, at APPROVING THE EXTENDED PATTERN FOR IMPLEMENTATION IF THE EXTENDED PATTERN PASSES THE TESTING 412, process flow proceeds to END 414.

In one embodiment, at END 414 the process for generating extended patterns from base patterns and testing the extended patterns is exited to await new data and/or instructions.

As noted above, the specific illustrative examples discussed above are but illustrative examples of implementations of embodiments of the method or process for generating extended patterns from base patterns and testing the extended patterns. Those of skill in the art will readily recognize that other implementations and embodiments are possible. Therefore, the discussion above should not be construed as a limitation on the claims provided below.

In one embodiment, a computing system implemented method automatically generates extended patterns from base patterns. The method includes maintaining a pattern library including one or more patterns corresponding to a machine image for implementing cloud-based applications, each pattern including configuration data related to a cloud computing architecture and security standards data related to security standards for implementing applications with the cloud computing architecture. The method includes receiving, with an automatic pattern generation engine, a request to generate an extended pattern from a base pattern included in the pattern library and receiving, with the automatic pattern generation engine, attributes data corresponding to attributes for the extended pattern. The method includes generating, with the automatic pattern generation engine, the extended pattern based on the attributes data and the base pattern and generating, with an automatic pattern testing engine, test case data including test cases for testing the extended pattern based on the attributes data. The method includes testing, with the automatic pattern testing engine, the extended pattern according to the test cases and if, the extended pattern does not pass the test cases, denying publication of the extended pattern. The method includes and if the extended pattern passes the test cases, publishing the extended pattern to the pattern library.

In one embodiment, a system for generating extended patterns from base patterns and testing the extended patterns, the system includes at least one processor at least one memory coupled to the at least one processor. The at least one memory has stored therein instructions which, when executed by any set of the one or more processors, perform a process including maintaining a pattern library including one or more patterns corresponding to a machine image for implementing cloud-based applications, each pattern including configuration data related to a cloud computing architecture and security standards data related to security standards for implementing applications with the cloud computing architecture. The process includes receiving, with an automatic pattern generation engine, a request to generate an extended pattern from a base pattern included in the pattern library and receiving, with the automatic pattern generation engine, attributes data corresponding to attributes for the extended pattern. The process includes generating, with the automatic pattern generation engine, the extended pattern based on the attributes data and the base pattern and generating, with an automatic pattern testing engine, test case data including test cases for testing the extended pattern based on the attributes data. The process includes testing, with the automatic pattern testing engine, the extended pattern according to the test cases and, if the extended pattern does not pass the test cases, denying publication of the extended pattern. The process includes, if the extended pattern passes the test cases, publishing the extended pattern to the pattern library.

In one embodiment, a computing system implemented method automatically generates extended patterns from base patterns. The method includes receiving, with an automatic pattern generation engine, a request to generate an extended pattern from a base pattern included in a pattern library. The base pattern defines a machine image for implementing cloud-based applications for a data management system and including security standards data related to security standards for implementing applications for the data management system. The method includes receiving, with the automatic pattern generation engine, attributes data corresponding to attributes for the extended pattern and generating, with the automatic pattern generation engine, the extended pattern by adjusting the base pattern in accordance with the attributes data and retaining the security standards of the base pattern. The method includes testing the extended pattern, with an automatic pattern testing engine, by generating test cases for the extended pattern based on the attributes data and approving the extended pattern for implementation if the extended pattern passes the testing.

In one embodiment, a system for generating extended patterns from base patterns and testing the extended patterns, the system includes at least one processor at least one memory coupled to the at least one processor. The at least one memory has stored therein instructions which, when executed by any set of the one or more processors, perform a process includes receiving, with an automatic pattern generation engine, a request to generate an extended pattern from a base pattern included in a pattern library. The base pattern defines a machine image for implementing cloud-based applications for a data management system and includes security standards data related to security standards for implementing applications for the data management system. The process includes receiving, with the automatic pattern generation engine, attributes data corresponding to attributes for the extended pattern and generating, with the automatic pattern generation engine, the extended pattern by adjusting the base pattern in accordance with the attributes data and retaining the security standards of the base pattern. The process includes testing the extended pattern, with an automatic pattern testing engine, by generating test cases for the extended pattern based on the attributes data. The process includes approving the extended pattern for implementation if the extended pattern passes the testing.

Using the disclosed embodiments of a method and system for generating extended patterns from base patterns and testing the extended patterns, a method and system for generating extended patterns from base patterns and testing the extended patterns more accurately is provided. Therefore, the disclosed embodiments provide a technical solution to the long standing technical problem of efficiently and accurately developing and deploying complex software applications.

The disclosed embodiments of a method and system for generating extended patterns from base patterns and testing the extended patterns are also capable of dynamically adapting to constantly changing fields such as data managements systems. Consequently, the disclosed embodiments of a method and system for generating extended patterns from base patterns and testing the extended patterns also provide a technical solution to the long standing technical problem of static and inflexible data management systems.

The result is a much more accurate, adaptable, and robust method and system for generating extended patterns from base patterns and testing the extended patterns. This, in turn, results in: less human and processor resources being dedicated to developing, integrating, and testing software applications and portions of software application, i.e., usage of fewer processing resources, usage of fewer memory storage assets, and less communication bandwidth being utilized to transmit data for analysis.

The disclosed method and system for generating extended patterns from base patterns and testing the extended patterns does not encompass, embody, or preclude other forms of innovation in the area of complex software application development and integration. In addition, the disclosed method and system for generating extended patterns from base patterns and testing the extended patterns is not related to any fundamental economic practice, fundamental data processing practice, mental steps, or pen and paper-based solutions, and is, in fact, directed to providing solutions to new and existing problems associated with complex software development environments. Consequently, the disclosed method and system for generating extended patterns from base patterns and testing the extended patterns, does not encompass, and is not merely, an abstract idea or concept.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors, the method comprising:
   maintaining a pattern library including one or more patterns corresponding to a machine image for implementing cloud-based applications, each pattern including configuration data related to a cloud computing architecture and security standards for implementing applications with the cloud computing architecture;
   receiving, with an automatic pattern generation engine, a request to generate an extended pattern from a base pattern included in the pattern library;
   receiving, with the automatic pattern generation engine, attributes for the extended pattern;
   generating, with the automatic pattern generation engine, the extended pattern based on the attributes and the base pattern;
   generating, with an automatic pattern testing engine, test cases for testing the extended pattern based on the attributes;
   testing, with the automatic pattern testing engine, the extended pattern according to the test cases;
   if the extended pattern does not pass the test cases, denying publication of the extended pattern; and
   if the extended pattern passes the test cases, publishing the extended pattern to the pattern library.

2. The method of claim 1, further comprising generating validation data indicating failure or passage of the test cases.

3. The method of claim 2, wherein the validation data indicates, for each failed test case, why the test case failed.

4. The method of claim 1, wherein the test cases include, for each of the attributes, a respective test case.

5. The method of claim 1, wherein the test cases include, for at least one of the attributes, multiple test cases.

6. The method of claim 1, wherein the test cases include security test cases that test security of the extended pattern.

7. The method of claim 6, wherein one or more of the security test cases are not based on the attributes.

8. The method of claim 1, wherein the test cases include hygiene test cases that test the hygiene of software implemented with the extended pattern.

9. The method of claim 8, wherein one or more of the hygiene test cases are not based on the attributes.

10. The method of claim 1, wherein the test cases include one or more performance test cases that test whether the extended pattern achieves selected performance benchmarks.

11. The method of claim 10, wherein one or more of the performance test cases are not based on the attributes.

12. The method of claim 1, wherein the automatic pattern testing engine automatically generates the test cases when the automatic pattern testing engine receives the extended pattern from the automatic pattern generation engine.

13. The method of claim 1, wherein the request to generate the extended pattern is a request to generate the extended pattern from multiple base patterns included in the pattern library.

14. The method of claim 1, wherein the extended pattern corresponds to a cloud-based microservice.

15. The method of claim 14, wherein the cloud-based microservice is part of a data management system.

16. The method of claim 15, wherein the data management system includes one or more of:
a tax return preparation system,
a bookkeeping system;
an accounting system; and
a transaction monitoring system.

17. The method of claim 14, wherein the cloud-based microservice includes:
a web server;
an application server; and
a persistent layer.

18. The method of claim 17, wherein the persistent layer includes a database.

19. The method of claim 1, wherein the attributes include one or more of:
a user under which the extended pattern will run;
a Unix group to which the extended pattern will be assigned;
a path to a configuration directory for configuration files;
a root log directory for the extended pattern;
an absolute path to a process identification number filed for the extended pattern;
a hash that maps an extended pattern log format to a definition;
a default log format; and
a hash representing directives at a top level of an extended pattern configuration file.

20. The method of claim 1, wherein the extended pattern defines a web server configuration.

21. A method performed by one or more processors, the method comprising:
receiving, with an automatic pattern generation engine, a request to generate an extended pattern from a base pattern included in a pattern library, the base pattern defining a machine image for implementing cloud-based applications for a data management system and including security standards for implementing applications for the data management system;
receiving, with the automatic pattern generation engine, attributes for the extended pattern;
generating, with the automatic pattern generation engine, the extended pattern by adjusting the base pattern in accordance with the attributes and retaining the security standards of the base pattern;
testing the extended pattern, with an automatic pattern testing engine, by generating test cases based on the attributes; and
approving the extended pattern for implementation if the extended pattern passes the testing.

22. The method of claim 21, wherein the automatic pattern generation engine and the automatic pattern testing engine define a development pipeline that automatically generates and tests the extended pattern responsive to receiving the attributes.

23. The method of claim 21, wherein the automatic pattern generation engine only generates the extended pattern if the attributes do not violate security standards of the base pattern.

24. The method of claim 21, wherein the base pattern identifies, as components of the machine image, one or more of:
processing resources;
storage resources;
server resources; and
operating system resources.

25. The method of claim 21, wherein the base pattern corresponds to a machine image for providing cloud-based data management service applications.

26. A system comprising:
at least one processor; and
at least one memory storing instructions that, when executed by the at least one processor, cause the system to:
maintain a pattern library including one or more patterns corresponding to a machine image for implementing cloud-based applications, each pattern including configuration data related to a cloud computing architecture and security standards for implementing applications with the cloud computing architecture;
receive, with an automatic pattern generation engine, a request to generate an extended pattern from a base pattern included in the pattern library;
receive, with the automatic pattern generation engine, attributes for the extended pattern;
generate, with the automatic pattern generation engine, the extended pattern based on the attributes and the base pattern;
generate, with an automatic pattern testing engine, test cases for testing the extended pattern based on the attributes;
test, with the automatic pattern testing engine, the extended pattern according to the test cases;
if the extended pattern does not pass the test cases, deny publication of the extended pattern; and
if the extended pattern passes the test cases, publish the extended pattern to the pattern library.

27. The system of claim 26, wherein the extended pattern is a machine image for implementing applications in one or more of:
an Amazon Web Services (AWS) cloud computing environment;
a Microsoft Azure cloud computing environment; and
a Google Cloud cloud computing environment.

28. The system of claim 26, wherein the machine image defines an application container.

29. The system of claim 26, wherein the extended pattern defines an application stack.

30. A system comprising:
at least one processor; and
at least one memory storing instructions that, when executed by the at least one processor, cause the system to:
receive, with an automatic pattern generation engine, a request to generate an extended pattern from a base pattern included in a pattern library, the base pattern defining a machine image for implementing cloud-based applications for a data management system and including security standards for implementing applications for the data management system;
receive, with the automatic pattern generation engine, attributes for the extended pattern;
generate, with the automatic pattern generation engine, the extended pattern by adjusting the base pattern in accordance with the attributes and retaining the security standards of the base pattern;
test the extended pattern, with an automatic pattern testing engine, by generating test cases based on the attributes; and
approve the extended pattern for implementation if the extended pattern passes the testing.

31. The system of claim 30, wherein the extended pattern defines multiple operating systems that can be utilized with the machine image.

32. The system of claim 30, wherein executing an application with the extended pattern instantiates one or more virtual machines.

33. The system of claim 30, wherein the automatic pattern generation engine generates the extended pattern including the same security standards as the base pattern.

* * * * *